United States Patent [19]
Gossart

[11] Patent Number: 6,153,246
[45] Date of Patent: Nov. 28, 2000

[54] FOOD SUPPLEMENT CONTAINING CALCIUM AND ETHYL BUTYRATES

[75] Inventor: Philippe Gossart, Lalande de Pomerol, France

[73] Assignee: Compagnie Chimique d'Aquitaine, Lalande de Pomerol, France

[21] Appl. No.: 09/226,566

[22] Filed: Jan. 7, 1999

[30] Foreign Application Priority Data

Nov. 13, 1998 [FR] France .................................. 98 14275

[51] Int. Cl.⁷ .............................. A23L 1/29; A23L 1/304
[52] U.S. Cl. ......................... 426/531; 426/533; 426/623; 426/630; 426/635; 426/648; 426/807; 426/805
[58] Field of Search .................................. 426/531, 533, 426/623, 805, 807, 630, 635, 648

[56] References Cited

U.S. PATENT DOCUMENTS

| | | | |
|---|---|---|---|
| 3,806,600 | 4/1974 | Lapore et al. | 424/317 |
| 4,376,790 | 3/1983 | Ames | 426/2 |
| 4,473,545 | 9/1984 | Drake et al. | 424/22 |
| 4,735,967 | 4/1988 | Neesby | 514/557 |

FOREIGN PATENT DOCUMENTS

| | | |
|---|---|---|
| 0218324 | 4/1987 | European Pat. Off. . |
| 233819 | 8/1987 | European Pat. Off. . |
| 0464362 | 1/1992 | European Pat. Off. . |
| 630579 | 12/1994 | European Pat. Off. . |
| 8400668 | 3/1984 | WIPO . |

*Primary Examiner*—Chhaya D. Sayala
*Attorney, Agent, or Firm*—Nawrocki, Rooney & Sivertson, P.A.

[57] ABSTRACT

The invention relates to a food supplement formulation intended to improve the digestibility of food intakes, notably for animals, comprising a mixture of butyrates to which there are optionally added sweeteners, vitamins and preservatives. The invention also concerns a food composition containing such a supplement formulation, as well as the uses of a mixture of butyrates with a view to improving the digestibility of the food intakes.

23 Claims, No Drawings

FOOD SUPPLEMENT CONTAINING CALCIUM AND ETHYL BUTYRATES

The invention relates to a food supplement formulation intended for feeding.

It also relates to a food composition comprising such a formulation as well as to its uses.

Finally it relates to a method for improving the digestibility of foods.

It is known that food intakes can be supplemented by additions of different substances.

These additions are generally used by mixing, with the food intake, one or more supplementary formulations in the form of a liquid, powder, granules, tablets etc.

The products forming part of these supplementary formulations are chosen according to the sought-for aim.

For example, formulations have been produced for increasing the consumption of food and the average weight of animals.

Thus the document FR-A-2 706 738 concerns such a food supplement formulation, comprising a binary mixture of sodium butyrate and ethyl butyrate, in which the butyric acid is stabilised.

It is also known that food supplement formulations can be used for increasing milk production in dairy cows.

For example, the document EP-A-0 233 819 discloses such a food supplement formulation comprising a mixture of calcium salt and isobutyric acid and at least one acid chosen from amongst isovaleric, valeric and 2-methylbutyric acids, and 5 to 15% of an additive comprising copra oil and tallow.

It is also desirable to improve the digestibility of food intakes given to animals.

Such an improvement is obviously desirable in general terms but also have an additional interest in certain cases.

For example, for pets, such as dogs and cats, having an urban way of life.

This is because, in such cases, the animal is subject to unfavourable external factors related to its environment, such as noise or motor traffic, air pollution, etc.

In addition, an urban animal generally only has a small amount of space for getting fresh air and cleaning its organism.

These external factors generally have a negative effect on the quality of digestion with serious consequences for the animal.

Such an inadequate or poor-quality digestion of food intakes can in fact result in weakening of the intestinal villosities, which can cause abscesses, ulcers or even cancers of the intestine.

The invention aims to propose a food supplement formulation for animals or humans, which can be used as a growth and consumption factor and improves the digestibility of food intakes.

Notably by affording a revitalisation of the intestinal villosities of the animals and increasing the exocrine and endocrine intestinal and pancreatic secretions.

To this end, the food supplement formulation intended for human or animal food according to the invention comprises a mixture of calcium butyrate and ethyl butyrate, optionally with sodium butyrate added.

In the present patent application and for convenience of language, butyrate means all forms of this compound. In particular, the term "butyrate" as used in the present patent application encompasses notably isobutyrate.

According to other characteristics, the supplement formulation comprises between approximately 99.99% and approximately 40% by weight calcium butyrate, with respect to the total weight of the formulation, and between approximately 0.01% and approximately 60% by weight ethyl butyrate, with respect to the total weight of the formulation.

In the variant embodiment according to which the formulation of the invention comprises a mixture of calcium butyrate, sodium butyrate and ethyl butyrate, the total quantity of calcium butyrate and sodium butyrate varies between approximately 99.99% and approximately 40% by weight, with respect to the total weight of the formulation.

According to one embodiment, the food supplement formulation comprises in addition other butyric acid salts, notably potassium butyrate.

According to this embodiment, the supplement formulation comprises between approximately 99.99% and approximately 40% by weight calcium and potassium butyrate, and optionally sodium butyrate, with respect to the total weight of the formulation.

An example of a formulation of the invention comprises, expressed in percentage by weight with respect to the total weight of the formulation, approximately 45% calcium butyrate, approximately 50% sodium butyrate and approximately 5% ethyl butyrate.

The supplement formulation of the invention can also comprise one or more compounds able to give rise to an attraction, notably of the animal to the food intake which contains it (i.e., the compounds or substances are specifically capable of further attracting or drawing animals to food supplemented with the formulation).

Such attractant compounds are for example sweeteners, chosen notably from amongst artificial sugars, saccharins, fructose and derivatives and/or mixtures thereof.

Such substances can be present in the formulation of the invention, in a quantity varying between approximately 0.01% and approximately 5% by weight with respect to the total weight of the formulation.

According to another variant execution, the supplement formulation comprises one or more compounds able to produce butyrate in the intestine.

Such compounds are for example oligosaccharides.

The food supplement formulation can also comprise one or more additional substances, such as vitamins in a quantity of around a few parts per million (ppm), mineral compounds, antioxidants or preservatives, known per se and used in human or animal food.

It can also be envisages incorporating, in the supplement formulation, one or more medicaments or substances capable of having a therapeutic or preventative action with regard notably to animals.

It was observed that the supplement formulation of the invention made it possible, in addition to its action on the intestinal villosities, to improve the quality of the faeces produced, which are generally less smelly and smaller.

The food supplement formulation of the invention is generally in solid form. For example, it can be in the form of granules, powder, tablets, etc.

When the formulation of the invention comprises liquid ingredients, typically ethyl butyrate, they can be absorbed on a conventional inert medium, such as colloidal silica.

The calcium butyrate used in the production of the formulation of the invention can be synthesised from an equimolar mixture of butyric acid and a calcium salt of phosphoric acid.

Sodium butyrate can be synthesised according to the method described in the document FR-A-2 706 738.

The supplement formulation according to the invention is applied to the food in a quantity varying between approximately 0.01% and approximately 2% by weight, with respect to the weight in the food.

More particularly, the formulation of the invention can be applied to the food in a quantity varying between approximately 0.05% and approximately 0.5% by weight, with respect to the weight in the food.

The invention also relates to a food composition for animals comprising a food supplement formulation whose characteristics are mentioned above.

The food composition of the invention comprises at least one food supplement formulation as described above, and is intended notably for dog and cat food.

Such a food composition comprises approximately 99.9% to approximately 99% by weight cereals, cereal by-products and/or animal and/or vegetable proteins and approximately 0.01% to approximately 2% by weight supplement formulation.

More particularly, the food composition comprises approximately 99.8% by weight to approximately 99.5% by weight cereals, cereal by-products and or animal and/or vegetable proteins and approximately 0.05% to approximately 0.5% by weight supplement formulation.

The invention also relates to the use of a mixture of calcium butyrate and ethyl butyrate, optionally with sodium butyrate added, as a consumption and growth factor which can be used in human or animal food, notably in food intakes for animals.

In animal food, the calcium butyrate and ethyl butyrate mixture more particularly finds a use in food for dogs, cats, pigs, poultry, ostriches, horses, fish, and ruminants such as cattle, sheep and goats.

The calcium butyrate and ethyl butyrate mixture can be in the form described above for the food supplement formulation.

The invention finally relates to a method for improving the digestibility of foods, comprising the step consisting of adding to a food an effective dose of a mixture comprising calcium butyrate and ethyl butyrate, optionally with sodium butyrate added.

According to the invention, the dose used for the above mixture varies between approximately 0.01% and approximately 2% by weight, with respect to the weight of the food.

The invention will be understood more clearly from a reading of the example embodiment which follows.

EXAMPLE

A formulation of the invention is prepared as follows.

75 g of calcium butyrate in powder form is mixed, at room temperature, with 25 g of ethyl butyrate absorbed on finely ground colloidal silica, until a homogeneous powder is obtained.

The powder thus obtained is incorporated, by mixing at room temperature, in 200 kg of a food intake comprising a mixture of cereals and cereal by-products.

What is claimed is:

1. A food supplement formulation intended for human or animal food, comprising a mixture of calcium butyrate and ethyl butyrate, said supplement being conducive to growth, and digestion of food intakes.

2. A formulation according to claim 1, characterised in that it comprises between approximately 99.99% and approximately 40% by weight calcium butyrate with respect to the total weight of the formulation and between approximately 0.01% and approximately 60% by weight ethyl butyrate with respect to the total weight of the formulation.

3. The formulation of claim 1, further including sodium butyrate.

4. A formulation according to claim 3, characterised in that the quantity of calcium butyrate and sodium butyrate varies between approximately 99.99% and approximately 40% by weight, with respect to the total weight of the formulation.

5. A formulation according to claim 4, characterised in that it comprises approximately 45% by weight calcium butyrate, approximately 50% by weight sodium butyrate and approximately 5% by weight ethyl butyrate, with respect to the total weight of the formulation.

6. A formulation according to claim 5, characterised in that it further comprises potassium butyrate.

7. A formulation according to claim 6, characterised in that it further comprises at least one substance specifically capable of attracting consumers of food supplemented with the formulation.

8. A formulation according to claim 7, characterised in that the attraction substance is a sweetener, selected from artificial sugars, saccharins, fructose and derivatives and/or mixtures of these substances.

9. A formulation according to claim 7, characterised in that the attraction substance is present in a quantity varying between 0.01% and approximately 5% by weight, with respect to the total weight of the formulation.

10. A formulation according to claim 9, characterised in that it further comprises one or more oligosaccharide compounds.

11. A formulation according to claim 10, characterised in that it further comprises one or more mineral compounds, vitamins, antioxidants, preservatives and/or medicaments.

12. A formulation according to claim 11, characterised in that it is in solid form.

13. A formulation according to claim 12, characterised in that it is in the form of granules, powder or tablets.

14. A formulation according to claim 13, characterised in that the ethyl butyrate is absorbed on an inert medium of colloidal silica.

15. A formulation according to claim 14, characterised in that it is applied to the food in a quantity varying between approximately 0.01% and approximately 2% by weight with respect to the weight in the food.

16. A formulation according to claim 15, characterised in that it is applied to the food in a quantity varying between approximately 0.05% and approximately 0.5% by weight with respect to the weight in the food.

17. A food composition for animals, characterised in that it comprises at least one food supplement formulation according to claim 16.

18. A composition according to claim 17, characterised in that it comprises approximately 99.9% to approximately 99% by weight cereals, cereal by-products and/or animal and/or vegetable proteins and approximately 0.01% to approximately 2% by weight supplement formulation.

19. A composition according to claim 17, characterised in that it comprises approximately 99.8% to approximately 99.5% by weight of a combination of two or more of cereals, cereal by-products and animal and vegetable proteins and approximately 0.05% to approximately 0.5% by weight of supplement formulation.

20. A composition according to claim 17, characterised in that it is intended for feeding dogs and cats.

21. A method for improving the digestibility of food, comprising the steps of adding to a food an effective dose of a mixture comprising calcium butyrate and ethyl butyrate.

22. A method according to claim 21, characterised in that the dose varies between approximately 0.01% and approximately 2% by weight, with respect to the weight of the food.

23. The method of claim 21, further including sodium butyrate.

* * * * *